United States Patent Office 3,817,895
Patented June 18, 1974

3,817,895
INHIBITING DISCOLORATION OF VINYLIDENE CHLORIDE POLYMERS
Carl Moore, Midland, Mich., assignor to The Dow Chemical Company, Midland, Mich.
No Drawing. Continuation of abandoned application Ser. No. 177,129, Sept. 1, 1971. This application Apr. 6, 1973, Ser. No. 348,776
Int. Cl. C08f 1/88, 27/02
U.S. Cl. 260—29.6 MN      2 Claims

ABSTRACT OF THE DISCLOSURE

A composition consisting essentially of a polymerizate of a monomeric material containing at least about 50 percent by weight of vinylidene chloride in combination with color stabilizing amounts of hydroxylamine hydrochloride.

This is a continuation of application Ser. No. 177,129, filed Sept. 1, 1971, now abandoned.

BACKGROUND OF THE INVENTION

It is known that dehydrohalogenation of vinylidene chloride polymers, e.g., during fabrication at elevated temperatures, produces discoloration. It has further been found that latexes of vinylidene chloride polymers exhibit discoloration during storage, particularly when such latexes are alkaline in nature, i.e., having a pH of between about 8 to 10. The color change is also believed to be the result of dehydrohalogenation of the polymer at the surface of the latex particles, accompanied by other chemical changes that generate chromophoric groups. This phenomenon occurs more rapidly as the surface area of the polymer exposed to the aqueous phase increases, i.e., as the size of the polymerizate particle becomes smaller.

It is the primary purpose of the present invention to inhibit such discoloration.

SUMMARY

The above and related objects are attained by means of a composition in accordance with the present invention which consists essentially of (1) the polymerizate of a monomeric material containing at least about 50 percent by weight vinylidene chloride with the remainder being at least one other monoethylenically unsaturated comonomer that is copolymerizable with vinylidene chloride and (2) from about 0.05 to 4 percent based on the weight of the polymerizate of hydroxylamine hydrochloride.

DESCRIPTION OF THE PREFERRED EMBODIMENTS

The vinylidene chloride polymers used in the compositions of the present invention are those containing at least about 50 percent by weight of vinylidene chloride, with the remainder being at least one monoethylenically unsaturated comonomer which is copolymerizable with vinylidene chloride. Exemplary of such comonomers are acrylonitrile, the acrylate and methacrylate esters, vinyl chloride, vinyl acetate, vinyl propionate, vinyl benzoate and isobutylene, alone or in combinations thereof, together with or without ionic comonomers such as 2-sulfoethyl methacrylate, acrylic acid, methacrylic acid, itaconic acid, maleic or fumaric acids or half esters and aconitic acid.

The amount of hydroxylamine hydrochloride which is to be used will vary somewhat with the specific polymeric material and the use thereof, e.g., when used to stabilize latex materials the particle size of the polymerizate is a significant factor in determining the amounts required, with smaller particle size polymerizates generally requiring larger amounts of the stabilizing agent. Generally, the protective effects may be noticed when as little as about 0.05 percent by weight of stabilizing agent is used with at least about 0.2 percent based on the weight of vinylidene chloride polymer being preferred. The upper limit of stabilizing agent will be determined principally by economic considerations, however, in most instances there will be little additional benefit to justify the use of more than about 4 percent of the stabilizing agent based on the weight of the vinylidene chloride polymer.

The stabilizing agent may be used in combination with vinylidene chloride resins which are to be thermally fabricated into shaped articles as well as in the preparation of polymeric latexes or lacquer coatings based on the vinylidene chloride polymers. When used to stabilize vinylidene chloride resins which are to be subsequently heat fabricated, the stabilizing agent may be physically blended with such polymer by conventional materials, or may be present during the polymerization of the monomeric materials forming such polymers.

The stabilizing agent may also be easily incorporated into a polymer latex by simple intermixing using conventional techniques. The latex compositions may contain the usual additives, such as emulsifiers, dyes, pigments, light stabilizer and fillers that, pursuant to conventional practice, are suitable for incorporation in the polymer formulation.

The advantages of the compositions of this invention will be apparent from the following examples, wherein all parts and percentages are to be taken by weight.

Example I

In each of a series of experiments, varying amounts of hydroxylamine hydrochloride were admixed with a series of polymeric latexes. The following Table I sets forth the composition and properties of each such latex.

TABLE I

|  | Latex designation | | | | |
|---|---|---|---|---|---|
|  | (1) | (2) | (3) | (4) | (5) |
| Polymerizate composition (parts by weight): | | | | | |
| Vinylidene chloride | 85 | 85 | 85 | 81 | 80 |
| Ethyl acrylate |  |  | 10 |  |  |
| n-Butyl acrylate | 7.5 | 10 |  | 15 | 15 |
| Methyl methacrylate | 7.5 | 5 | 5 | 4 |  |
| Acrylonitrile |  |  |  |  | 5 |
| 2-sulfoethyl methacrylate | 1.2 | 1.2 | 1.2 | 1.5 | 1.75 |
| Polymerizate average particle size (A) | 1,030 | 1,090 | 1,030 | 1,250 | 2,400 |
| Latex solids (percent) | 52.6 | 53.2 | 52.8 | 53.2 | 55.1 |

The following Table II sets forth the amount of hydroxylamine hydrochloride used and the effect on latex color following aging of each latex for varying periods of time.

TABLE II

| Exp. No. | Latex designation | Percent hydroxylamine hydrochloride | Latex pH[1] | Latex color after aging (hours) | | | | |
|---|---|---|---|---|---|---|---|---|
| | | | | 0 | 1 | 16 | 24 | 70 |
| Series I: | | | | | | | | |
| 1 | (1) | None | 9 | P-W | Sand | Brown | Brown | Dark brown. |
| 2 | (1) | 0.5 | 9 | P-W | P-W | Tan | Tan | Dark tan. |
| 3 | (1) | 0.5 | 2 | P-W | P-W | P-W | P-W | P-W. |
| Series II: | | | | | | | | |
| 4 | (2) | None | 9 | P-W | Sand | Brown | Brown | Dark brown. |
| 5 | (2) | 0.5 | 9 | P-W | P-W | Tan | Tan | Dark tan. |
| 6 | (2) | 1.0 | 9.1 | P-W | P-W | Light tan | Light tan | Light tan. |
| 7 | (2) | 0.5 | 2 | P-W | P-W | P-W | P-W | P-W. |
| Series III: | | | | | | | | |
| 8 | (3) | None | 9 | Pink | Yellow | Brown | Brown | Dark brown. |
| 9 | (3) | 0.5 | 9 | ....do | Pink | Tan | Dark tan | Dark tan. |
| 10 | (3) | 1.0 | 9 | ....do | do | Light tan | Tan | Tan. |
| 11 | (3) | [2]1.0 | 9 | ....do | do | do | Light tan | Light tan. |
| 12 | (3) | 0.5 | 2 | ....do | do | Pink | Pink | Pink. |
| Series IV: | | | | | | | | |
| 13 | (4) | None | 9 | White | White | Tan | Brown | Brown. |
| 14 | (4) | 0.5 | 9 | ....do | do | White | White | Cream. |
| 15 | (4) | 0.5 | 2 | ....do | do | do | do | White. |
| Series V: | | | | | | | | |
| 16 | (5) | None | 9 | ....do | do | do | Cream | Cream. |
| 17 | (5) | 0.5 | 9 | ....do | do | do | White | White. |
| 18 | (5) | 0.5 | 2 | ....do | do | do | do | Do. |

[1] Latex pH adjusted by addition of $NH_4OH$.
[2] Also contains 0.33% of the monosodium salt of N,N-dihydroxyethylglycine.

NOTE.—P-W=Pink-white.

Example II

A sample of latex (3) described in Table I of Example I was frozen overnight at —20° F. and then thawed. The latex solids and serum were treated with ammonium hydroxide to elevate the pH with and without the presence of hydroxylamine hydrochloride. After 24 to 48 hours aging, the solids that had been reslurried in deionized water and brought to a pH of 9.5 with ammonia (in the absence of hydroxylamine) were brown in color. By way of comparison, equivalent samples (but containing 1 percent by weight of hydroxylamine hydrochloride) were a light sand color after aging and were unchanged in color from that observed in the original recovered solids. The serum in all samples did not develop any color upon aging.

1. A process of inhibiting dehydrohalogenation induced discoloration of polymeric latexes said latexes having a pH of between about 8 and 10 and wherein the polymerizate present in said latexes is composed of at least about 50 percent by weight vinylidene chloride with the remainder being at least one other monoethylenically unsaturated comonomer comprising the post-addition to said latexes of from about 0.05 to 4 percent based on the weight of said polymerizate of hydroxylamine hydrochloride.

2. The process of claim 1 wherein said monoethylenically unsaturated monomer is selected from the group consisting of acrylonitrile, the acrylate and methacrylate esters, vinyl chloride, vinyl acetate, vinyl propionate, vinyl benzoate, isobutylene, 2-sulfoethyl methacrylate, acrylic acid, methacrylic acid, itaconic acid, maleic or fumaric acids or half esters and aconitic acid.

References Cited
UNITED STATES PATENTS

| | | | |
|---|---|---|---|
| 3,075,937 | 1/1963 | Bilow | 260—29.6 MN |
| 3,597,381 | 8/1971 | Ripley | 260—29.6 MN |
| 3,644,317 | 2/1972 | Monaco et al. | 260—29.6 MN |
| 3,706,705 | 12/1972 | Koyanagi et al. | 260—29.6 MN |

LUCILLE M. PHYNES, Primary Examiner

U.S. Cl. X.R.

260—29.6 N, 29.7 N